Feb. 9, 1937.  A. F. POOLE  2,070,238
ELECTRIC CLOCK
Filed Oct. 17, 1931
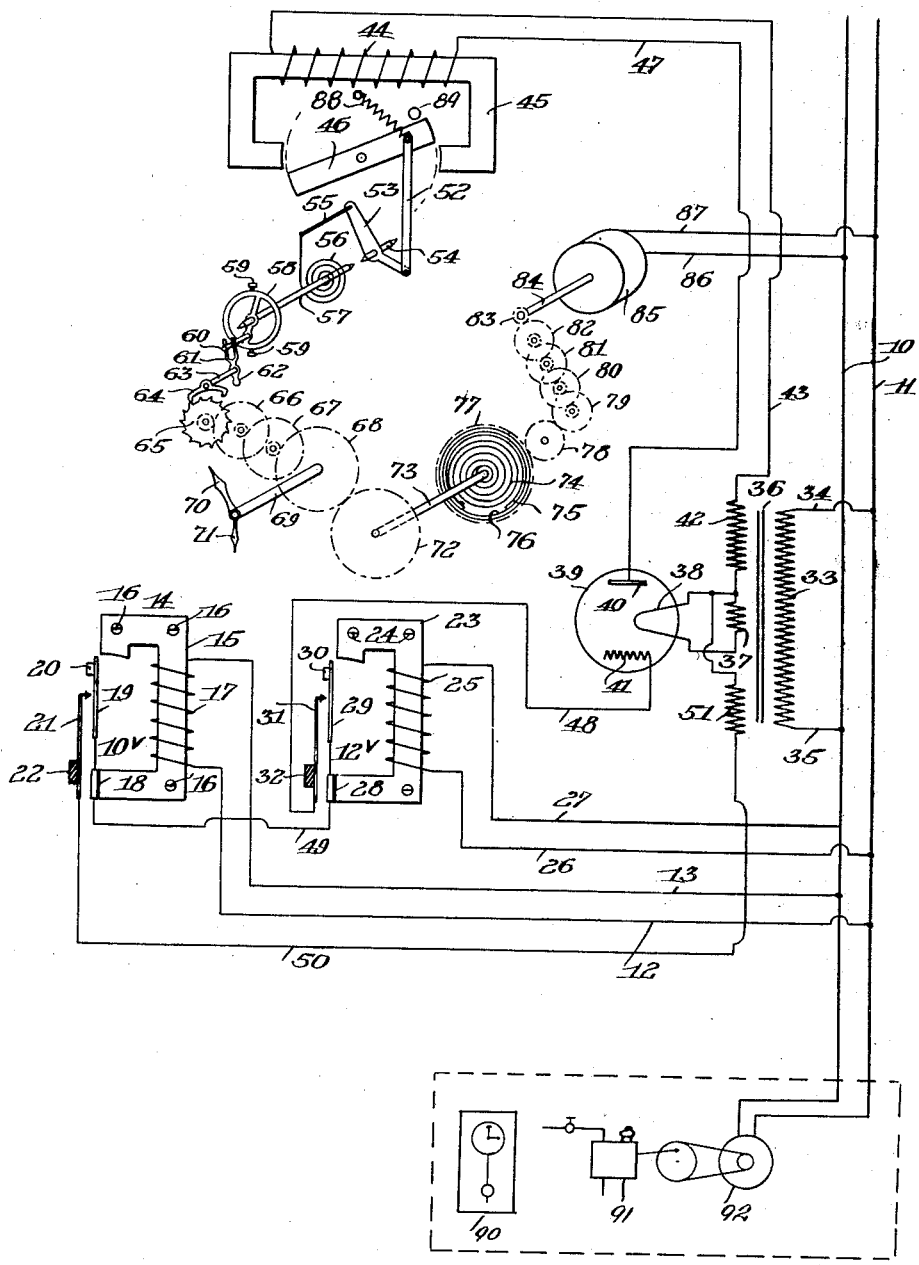
INVENTOR
Arthur F. Poole Patented Feb. 9, 1937

2,070,238

UNITED STATES PATENT OFFICE 2,070,238

ELECTRIC CLOCK

Arthur F. Poole, Ithaca, N. Y., by Maryline B. Poole, administratrix of said Arthur F. Poole, deceased, assignor to Maryline B. Poole, Ithaca, N. Y.

Application October 17, 1931, Serial No. 569,457

5 Claims. (Cl. 58—26)

My invention is an electric clock preferably designed to be actuated from a source of regulated alternating current. By regulated current I mean an alternating current whose frequency is closely regulated to a master clock so that the average number of cycles sent out in a given time is constant, usually 60 cycles per second.

One of the objects of my invention is to eliminate the synchronous motor commonly used in clocks run by regulated current, replacing said motor by an electrical frequency reducing device to hold a clock of ordinary construction in step with said current. Another object of my invention is the use of tuned reeds vibrating in step with the regulated current and by a novel heterodyne device, producing a current of low frequency which is used to hold a clock in step therewith. A further object of my invention is in the use of a triode to govern the circuit serving to heterodyne the two reeds to the end that its action be made certain and reliable. Another object of my invention is the novel means used to hold a balance in step with a current of nearly the same frequency as the period of said balance. The above and other objects of my invention will be apparent to those skilled in the art from the following specification and will be set forth in the claims.

In the preferable form of my invention, described herein, I take a regulated current of 60 cycles per second and from it vibrate two tuned reeds, one at the sub-multiple frequency of 12 per second and the other at 10 per second. The reeds are provided with means to heterodyne their frequency and produce a current of two cycles per second. This current is led through an electromagnet whose armature consequently makes two strokes per second and moves one end of a spring. The other end of this spring is attached to a balance wheel of a clock thus forcing the balance to keep in step with said current.

The clock may be wound by the 60 cycle current if desired and I have shown a device suitable for this purpose, altho such winding device forms no part of my present invention since it is shown in my issued Patent 1,328,247 of 1920. In my herein described invention so long as the 60 cycle current is on, the clock is held in step with it. When the current is interrupted the clock, which is regulated to keep approximate time, goes on until the current is resumed or the power stored in the clock mainspring has been used.

My invention may be best understood by reference to the diagrammatic drawing in which 10 and 11 are current mains serving to conduct an alternating current from a generator 92 driven by a prime mover 91, preferably regulated by a master clock 90. Joined to these mains by the conductors 12 and 13, is an electromagnet 14 built of laminations 15 held by bolts 16 and having a winding 17. An insulating plate 18 is mounted on the magnet 14 and carries a reed 19 tuned by a weight 20 to vibrate 10 cycles per second. A contact point 21 insulated from the framework by a plate 22 is provided to close a circuit (presently to be described) at each cycle of the reed 19.

Similarly, there is a second laminated electromagnet 23 whose laminations are held by bolts 24 having a winding 25 joined by conductors 26 and 27 to the mains 10 and 11. The magnet 23 is also provided with an insulator 28 on which is a reed 29 tuned by a weight 30 to 12 vibrations per second and also provided with a contact 31 mounted on an insulating block 32. Since both 10 and 12 are integral sub-multiples of 60 both reeds will vibrate at their tuned frequencies from the 60 cycle current. I prefer to make the reeds polarized either from a permanent magnet (not shown) or by making them of a steel suitable to be permanently magnetized.

Obviously, if one were to join the contacts 21 and 31 in series with a source of electromotive force, one would get a current of two impulses per second; however from considerations of the life of the contacts 21 and 31, I prefer for this purpose, to use a triode 39 having a plate 40, a grid 41 and a filament 38. A transformer 36 has a primary winding 33 connected by conductors 34 and 35 with the mains 10 and 11. A winding 37 supplies current to the filament 38 and a second winding 42 is joined by a wire 43 to a winding 44 on an electromagnet 45 having an armature 46 swung between the poles thereof and held by a spring 88 against a stop 89. The winding 44 is joined to the plate 40 by a wire 47. The grid 41 is joined by a wire 48 to the contact 31 and the reed 29 is connected to the reed 19 by a wire 49. A wire 50 joins the contact 21 to a winding 51 of the transformer 36 which is so designed to put a negative bias on the grid 41 when the contacts 21 and 31 are both closed. The usual grid leak (not shown) is placed between the grid and filament.

It is obvious that when the grid circuit is closed, that is when both contacts 21 and 31 are closed, no current will flow in the plate circuit since the negative bias of the grid will prevent it. When either of the contacts 21 or 31 are open then plate current will flow and the magnet 45 will be excited and attract its armature. The plate current will be composed of short impulses but the integral of these impulses will vary in magnitude with a period of two per second. The armature 46 is made to have a large moment of inertia so that it will not respond to the short current impulses but will respond to the impulses of a period of two per second. The armature 46 is connected by a link 42 to a lever 53 on a shaft 54 and has a rod 55 therein to which is secured a hairspring 56 which is fastened to a balance staff 57 co-linear with the shaft 54. The staff 57 carries a balance wheel 58 provided with timing screws 59 and a roller pin 60. The armature 46 will make two oscillations per second; since the balance is timed to make two oscillations per second also, the balance will be held in step with the armature 46 which in turn is held in step with the regulated current. Thus every beat of the balance, the hairspring 56 will be given an accurate impulse in a clockwise direction by action of the armature 46 being pulled away from the stop 89 to the position shown by dotted lines. After each long (2 per second) current impulse has ended, the armature 46, impelled by the action of the spring 88, will return to its original position against the stop 89.

The remainder of the structure is conventional clock practice and will be obvious to those skilled in the art by a brief description. The balance 58 is driven by a fork 69 with counterweight 62 on a shaft 63 on which is a pallet 64 driven by a scape wheel 65. The usual train of wheels, 66, 67 and 68 joins the scape wheel 65 to the center wheel 68 which is on a shaft 69 on which is the minute hand 70. An hour hand 71 is driven from 69 by the usual motion work (not shown). I have provided my clock with a conventional electric wind consisting of a wheel 72 which drives the center wheel 68 and is on a shaft 73 to which is fastened a mainspring 74 whose outer end is fastened to a slip spring 75 in a barrel 76. The barrel 76 has teeth 77 driven by a train of gears 78, 79, 80, 81, 82, and 83. The gear 83 is on a shaft 84 of an induction motor 85 connected to the mains 10 and 11 by the wires 86 and 87. The motor 85 winds the outside of the spring 74 faster than the inside runs down. The excess wind is taken care of by the slip spring 75.

While I have described my invention as used with a 60 cycle current and by reeds of a frequency of 10 and 12 producing a current of 2 to control a clock whose balance has a frequency of 2, these particular frequencies are merely the preferred ones, others may be used to secure the same result and will be within the scope of my herein described invention. In some of the following claims I have used the term "clock hands" to denote any means by which time may be read from a clock. Obviously, in a recording meter the position of the record sheet would give an indication of the time of the clock and such a device is within the scope of my invention despite the fact that the clock may be without hands.

Many changes may be made in the precise structure herein shown without departing from the spirit of my invention since I claim:—

1. In an electric clock the combination of a source of alternating current, a reed tuned to a submultiple of the frequency of said alternating current, a second reed tuned to a second submultiple of the frequency of said alternating current, electromagnetic means operated by said current to operate said reeds, a set of contacts operated by said first reed, a second set of contacts operated by said second reed, a circuit energized by said source of alternating current and including said first set of contacts and said second set of contacts, whereby a low frequency current is allowed to flow in said circuit by reason of the joint action of said two sets of contacts, clock hands, means to drive said clock hands, and means in said circuit whereby said hand driving means is held in step with said source of alternating current.

2. In an electric clock the combination of a source of alternating current, a reed tuned to a submultiple of the frequency of said alternating current, a second reed tuned to a second submultiple of the frequency of said alternating current, electromagnet means energized by said source of current to vibrate said reeds, a set of contacts operated by said first reed, a second set of contacts operated by said second reed, a triode, a circuit energized by said source of alternating current including said two sets of contacts and the grid of said triode whereby a low frequency current is allowed to flow in said circuit, an electromagnet in the plate circuit of said triode, clock hands, means to drive said clock hands, and means operated by said electromagnet to hold said driving means in step with said source of alternating current.

3. In an electric clock the combination of a source of alternating current, a reed tuned to a submultiple of the frequency of said alternating current, a second reed tuned to a second submultiple of the frequency of said alternating current, electromagnet means energized by said source of alternating current to vibrate said reeds, a set of contacts actuated by said first reed, a second set of contacts actuated by said second reed, a circuit energized by said source of alternating current and including said sets of contacts whereby a current of a submultiple frequency of said alternating current is allowed to flow in said circuit, an electromagnet in said circuit, a vibrating balance, and an elastic connection between said electromagnet and said balance to force said balance to vibrate in step with said source of alternating current.

4. In an electric clock, the combination of a source of alternating current, a current controlling means comprising a reed tuned to a submultiple frequency of said alternating current, a set of contacts actuated by said reed, a second reed tuned to a second submultiple frequency of said alternating current, a second set of contacts actuated by said second reed, and electromagnetic means energized by said source of alternating current for causing said reeds to vibrate, a circuit energized by said source of alternating current and including the said two sets of contacts of said current controlling means, whereby the resultant frequency in said circuit is determined by the frequencies of said two reeds, clock hands, means to drive said clock hands, and means in said circuit operated by said resultant frequency current for holding said hands in step with said alternating current.

5. In an electric clock the combination of a source of alternating current, a current controlling means comprising a reed tuned to a submultiple frequency of said alternating current, a set of contacts actuated by said reed, a second reed tuned to a second submultiple frequency of said alternating current, a second set of contacts actuated by said second reed, and electromagnetic means energized by said source of alternating current for causing said reeds to vibrate, a circuit energized by said source of alternating current and including the said two sets of contacts of said current controlling means, whereby the resultant frequency in said circuit is determined by the frequencies of said two reeds, clock hands, means to drive said clock hands, and an electromagnetic means in said circuit operated by said resultant frequency current for holding said hands in step with said alternating current.

ARTHUR F. POOLE.